Figure 1:
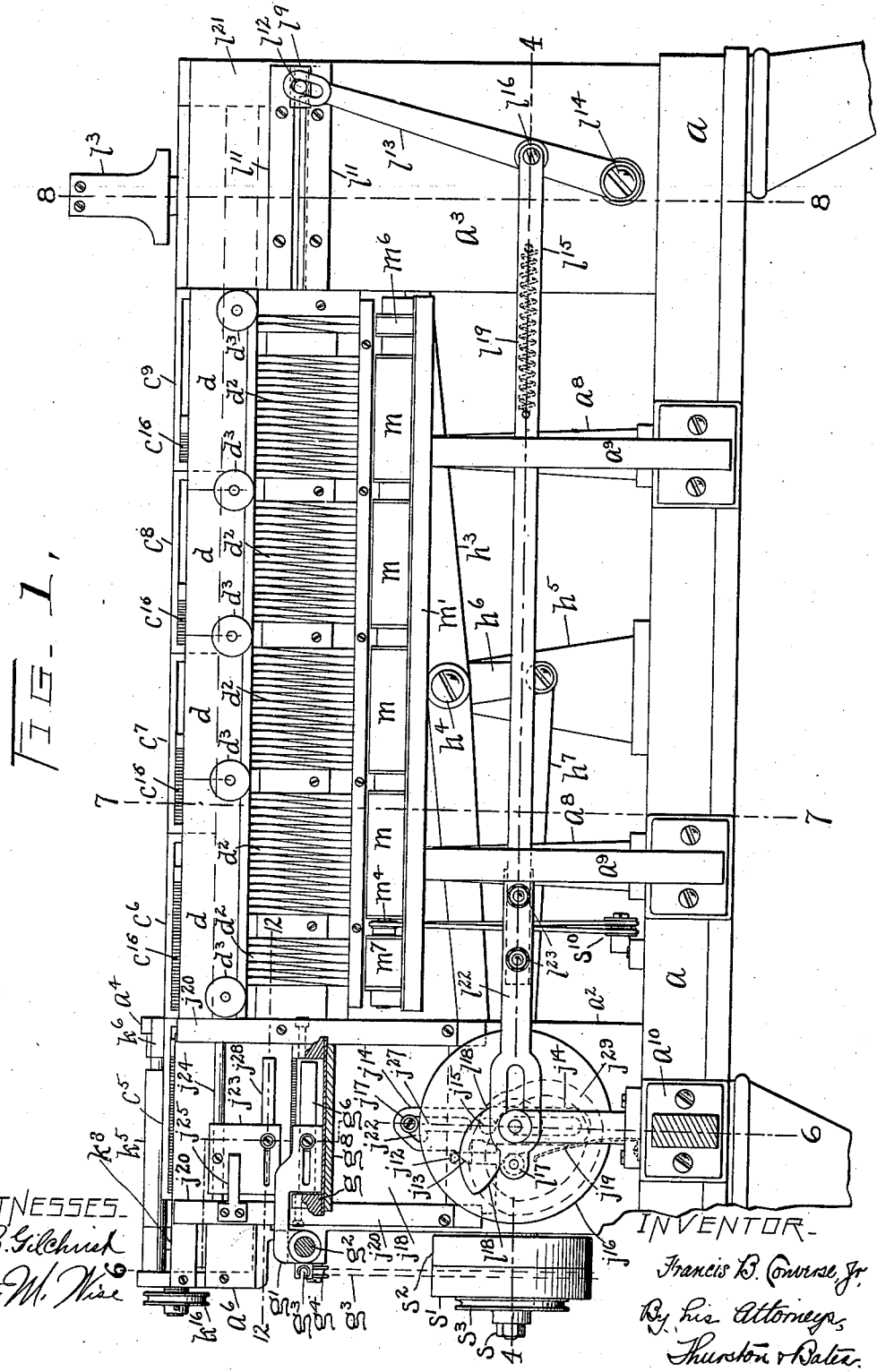

No. 657,309.   
F. B. CONVERSE, Jr.  
DISTRIBUTING MACHINE.  
(Application filed Jan. 18, 1900.)  
Patented Sept. 4, 1900.

(No Model.)  
9 Sheets—Sheet 1.

WITNESSES  
E. B. Gilchrist  
H. M. Wise

INVENTOR  
Francis B. Converse, Jr.  
By his Attorneys  
Thurston & Bates

No. 657,309. Patented Sept. 4, 1900.
F. B. CONVERSE, Jr.
DISTRIBUTING MACHINE.
(Application filed Jan. 13, 1900.)

(No Model.) 9 Sheets—Sheet 3.

No. 657,309. Patented Sept. 4, 1900.
F. B. CONVERSE, Jr.
DISTRIBUTING MACHINE.
(Application filed Jan. 13, 1900.)

(No Model.) 9 Sheets—Sheet 4.

No. 657,309. Patented Sept. 4, 1900.
F. B. CONVERSE, Jr.
DISTRIBUTING MACHINE.
(Application filed Jan. 13, 1900.)

(No Model.) 9 Sheets—Sheet 5.

WITNESSES
E. B. Gilchrist
H. M. Wise

INVENTOR Francis B. Converse, Jr.
By Thurston & Bates, his Attys.

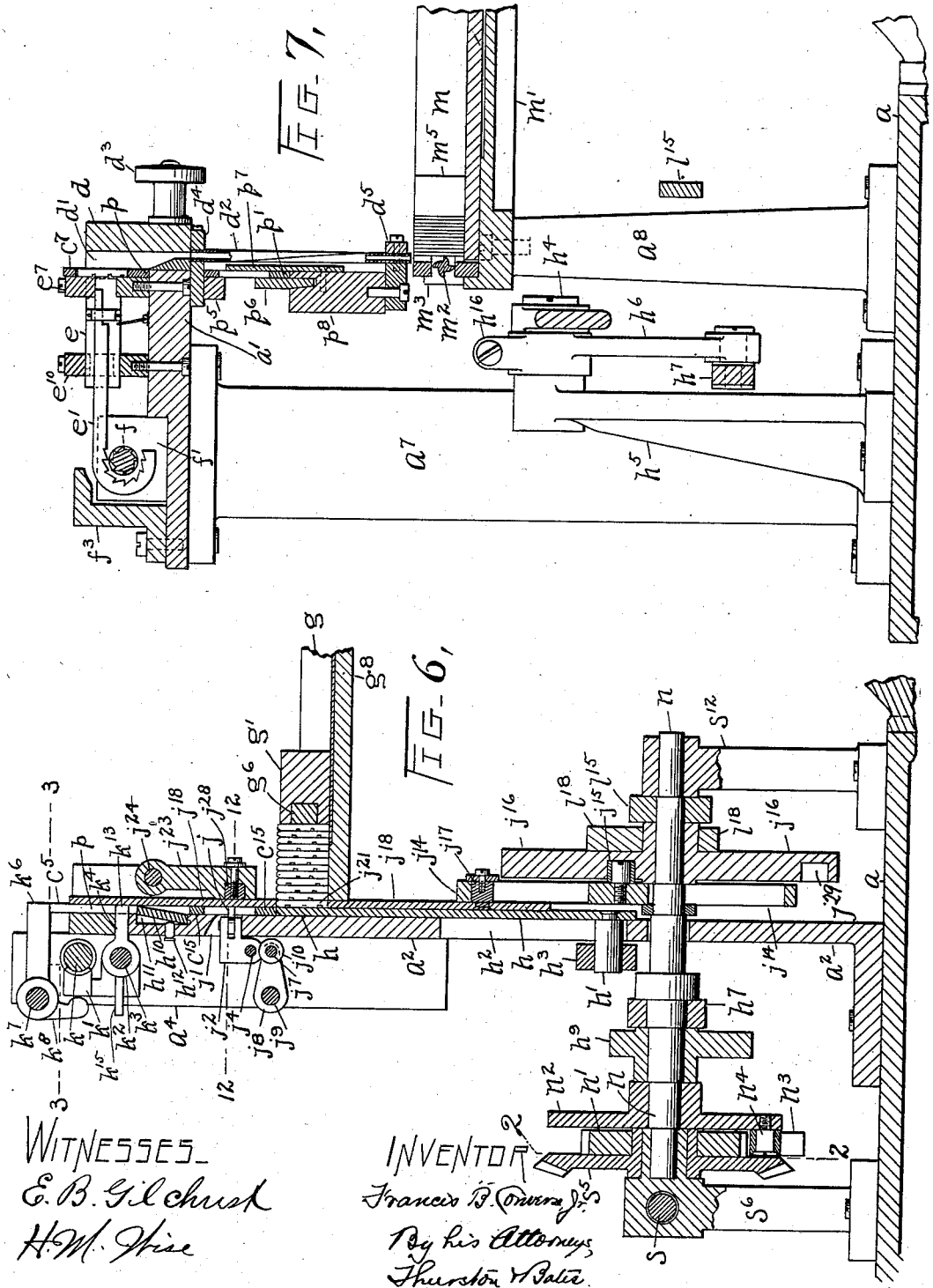

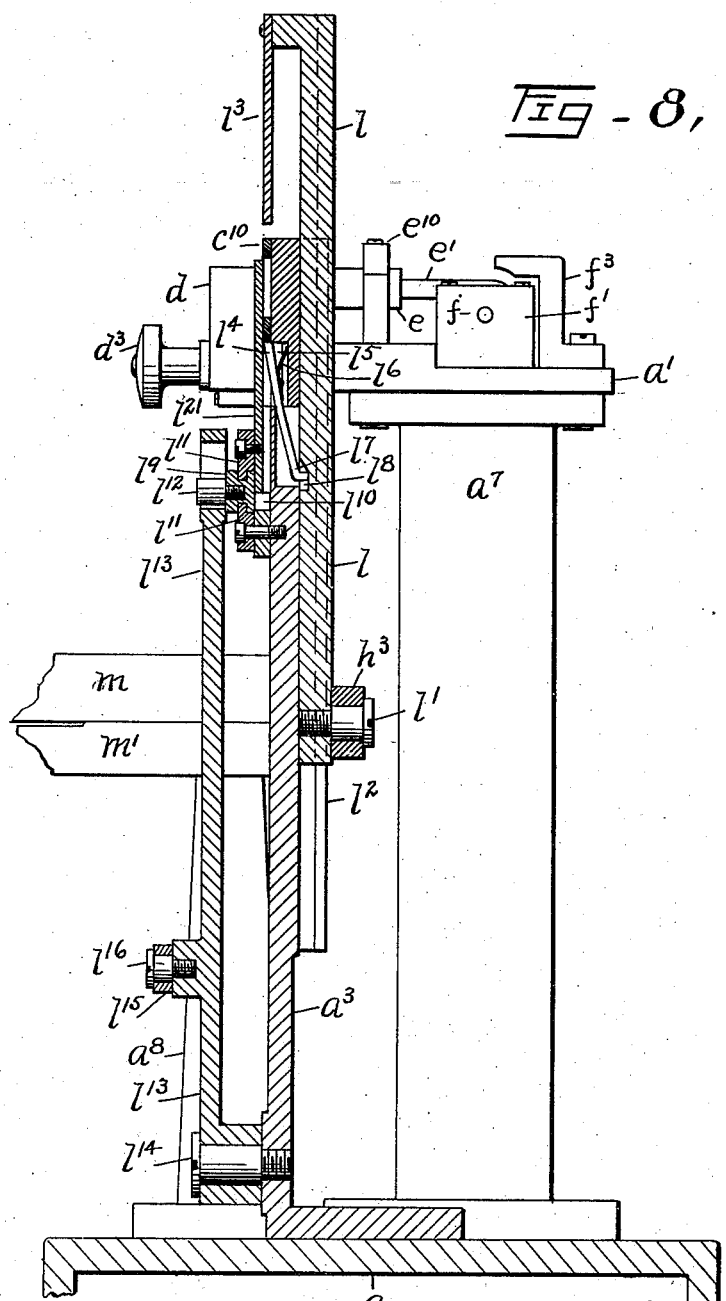

No. 657,309. Patented Sept. 4, 1900.
F. B. CONVERSE, Jr.
DISTRIBUTING MACHINE.
(Application filed Jan. 13, 1900.)
(No Model.) 9 Sheets—Sheet 8.
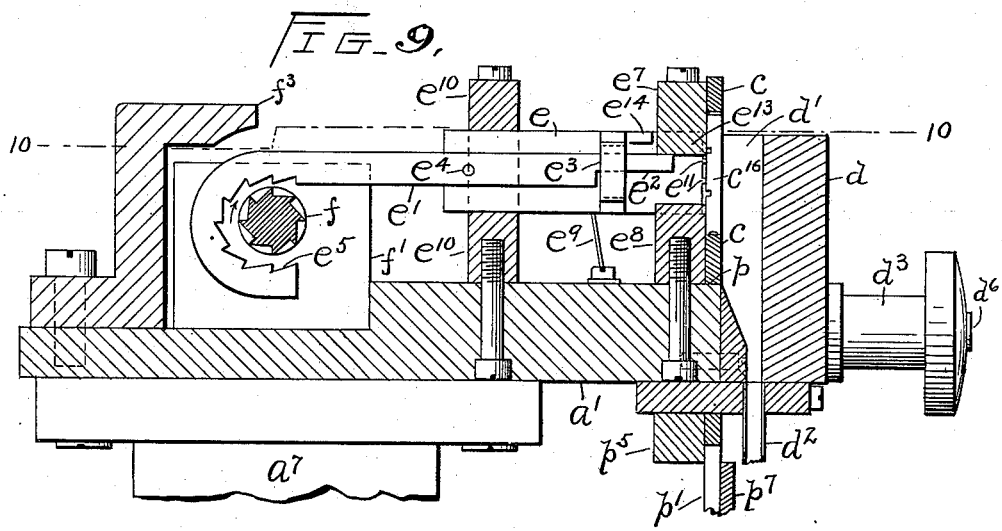
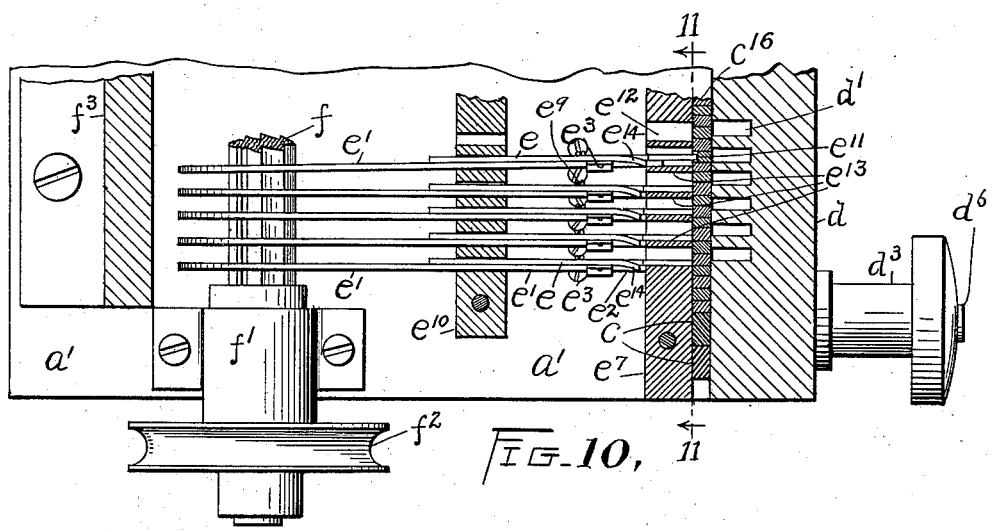
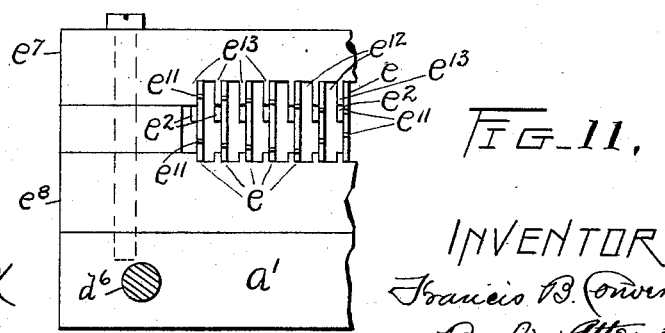
WITNESSES
E. B. Gilchrist
H. M. Wise.
INVENTOR
Francis B. Converse Jr.
By his Attorneys,
Thurston & Bates.

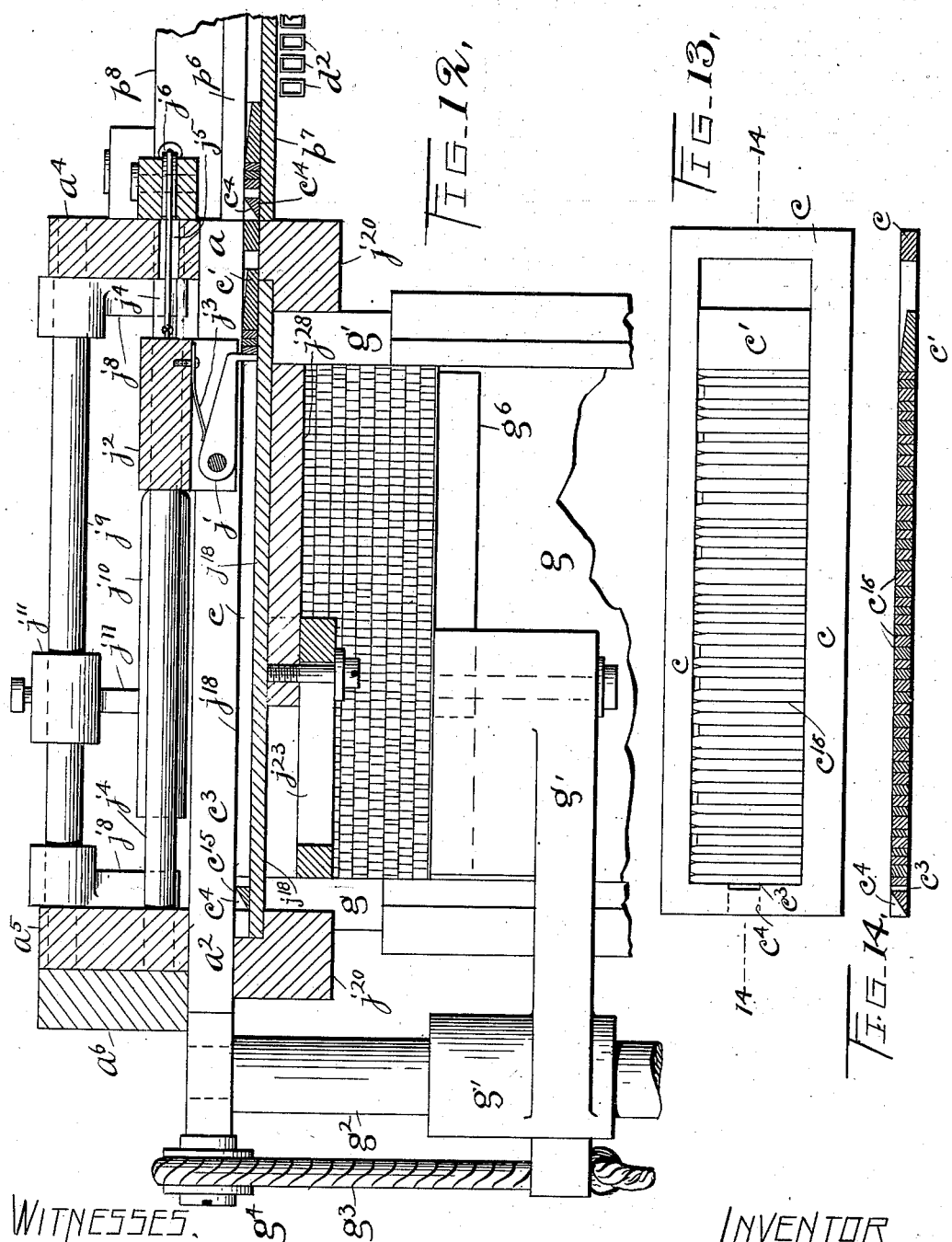

UNITED STATES PATENT OFFICE.

FRANCIS B. CONVERSE, JR., OF LOUISVILLE, KENTUCKY, ASSIGNOR TO THE CONVERSE MANUFACTURING COMPANY, OF CLEVELAND, OHIO.

DISTRIBUTING-MACHINE.

SPECIFICATION forming part of Letters Patent No. 657,309, dated September 4, 1900.

Application filed January 13, 1900. Serial No. 1,272. (No model.)

*To all whom it may concern:*

Be it known that I, FRANCIS B. CONVERSE, Jr., a citizen of the United States, residing at Louisville, in the county of Jefferson and State of Kentucky, have invented a certain new and useful Improvement in Distributing-Machines, of which the following is a full, clear, and exact description, reference being had to the accompanying drawings.

The object of my invention is to provide a machine for distributing type which while being cheap in construction and certain in performance shall be of extremely-rapid operation.

The machine is adapted to distribute any kind of type, which word herein includes both the ordinary printers' type (cameo) and the matrices of a line-casting machine. In the former case one distributer may be employed in conjunction with several setting-machines. As several distributing-machines as now constructed are required for distributing the product of a large printing-office, it will be readily appreciated that an increase in speed of operation will reduce the number of machines required, and this increase of speed being attained without sacrificing other desirable features, but rather enhancing them, the efficiency of the printing-office so equipped is greatly increased. In enabling this increased speed of operation I have devised a system of distribution whereby the type can be distributed not simply singly from the end of a line, as has been heretofore done, but from any point in the line. In other systems heretofore devised the type are carried singly through the machine, each one in a separate carrier, or else, if more than a single type is taken in the carrier, they are carried through the machine until each type as it is left on the end of the line is in its turn removed. When the type are taken singly in the carriers, only one type can be distributed for each travel of a carrier through the machine. Likewise when a whole line is taken in the carrier and the type are taken off the end of the line only no distribution can begin until the line reaches the removing mechanism which corresponds to the end type, and when the removal of this type is accomplished the next succeeding type may have already passed the point for its removal, so that no more distribution can occur on that trip of the line. Thus frequently only one type will be removed from a whole line in one passage through the machine, and from the nature of the operation only a few at most will be distributed, whereas with my system the removal of any type is not dependent on the prior removal of the type preceding it in the line, but the type are distributed when they come opposite their proper receptive openings irrespective of their position in the line, several type being frequently removed simultaneously and all of the type being distributed in one trip through the machine, except where two or more type of the same character are consecutive, in which case the last one will be removed and the preceding ones ordinarily carried over for the next trip; but (as will be hereinafter explained) this does not usually delay the operation of distribution.

In my system the distribution is preferably controlled by a system of definitive nicks on the edge of the type, which automatically throw into operation corresponding ejectors; but the invention consists, broadly, in the combination, with means for holding type, of removing mechanism automatically operating by any means to remove the proper type and means whereby such removal takes place throughout the line and not simply at the end of it.

More particularly the invention comprehends the combination of carriers adapted to convey lines of type through the machine, ejectors having wards adapted to register with nicks in the type, a stop on the side of the type opposite the ejector at a position opposite such ejector, and an opening in advance of said type and means whereby when the wards of the ejector correspond with the nicks of a type they shall enter them and the engaging end of the ejector be drawn forward until the type is opposite an opening instead of a stop and the ejector be then forced forward, so as to shove the type from the line into the opening.

The invention includes also the embodiment of the invention I have shown in the drawings and hereinafter described, and, summarizing it, it may be stated as consisting of the combination of parts hereinafter illustrated, and set out in the claims.

The drawings clearly disclose the invention.

Figure 2:
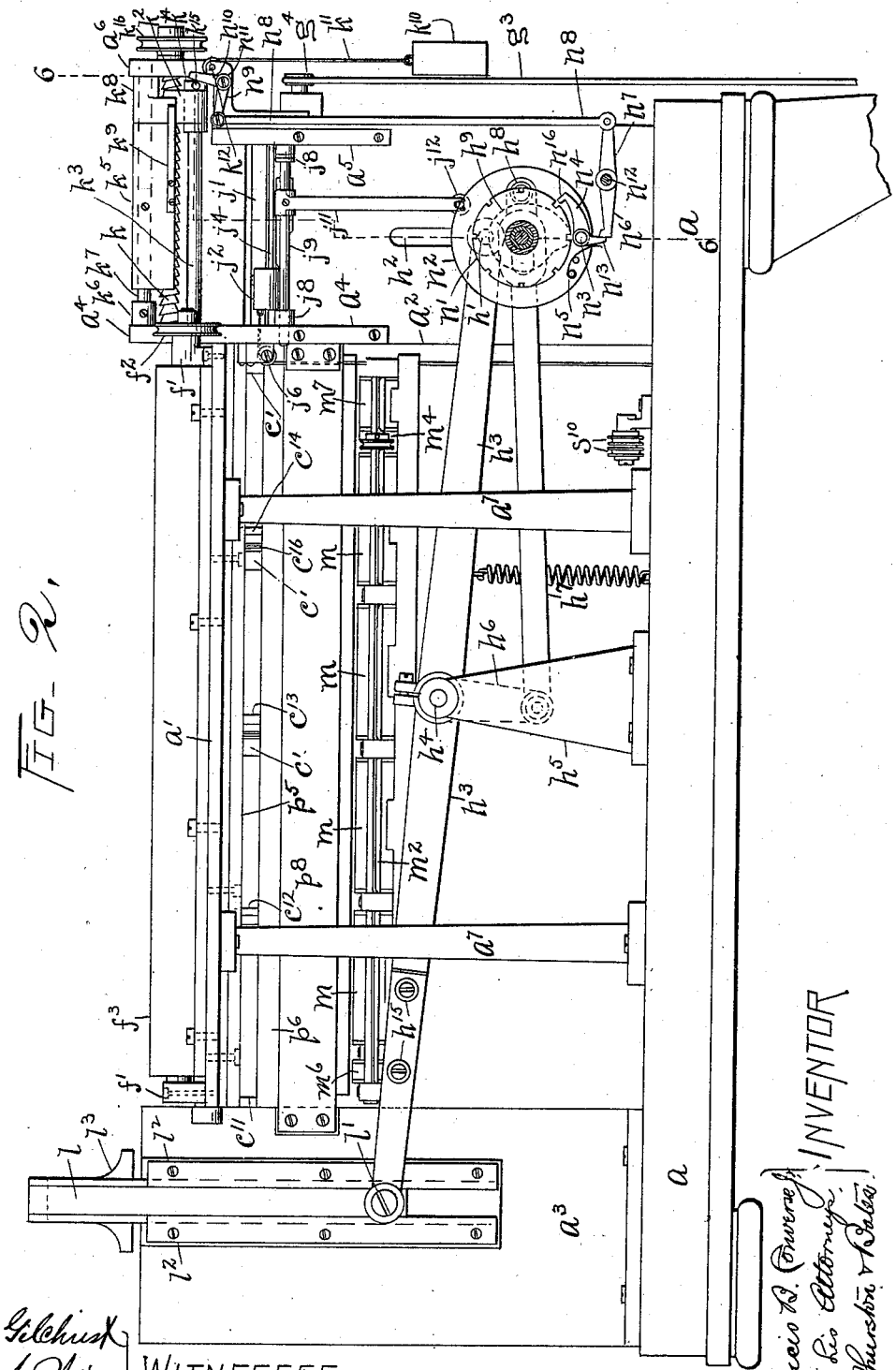
Figure 3:
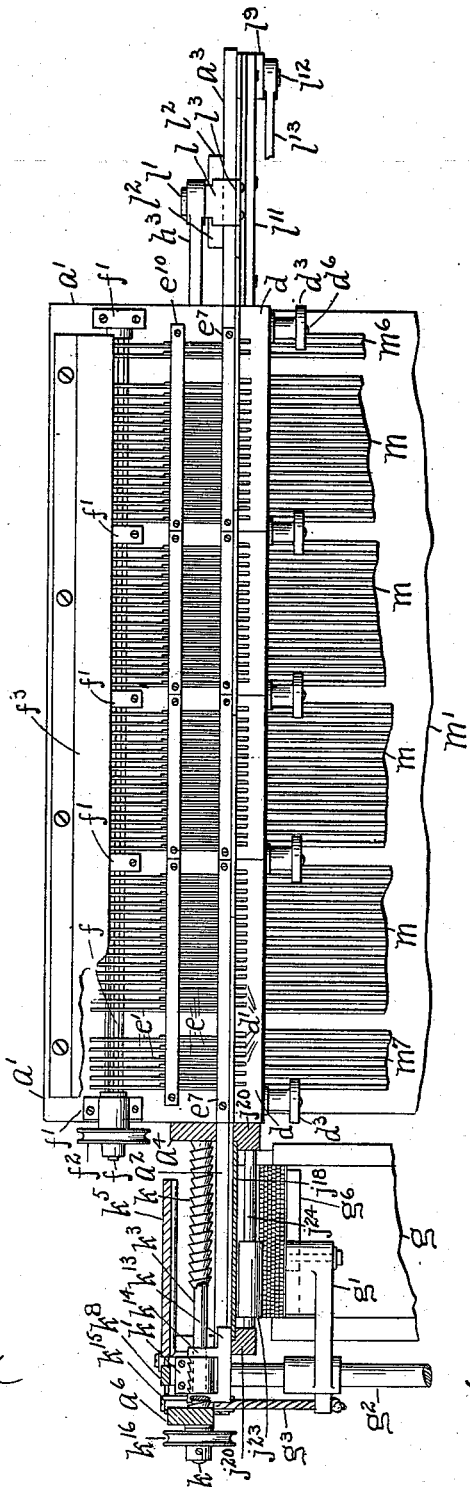
Figure 4:
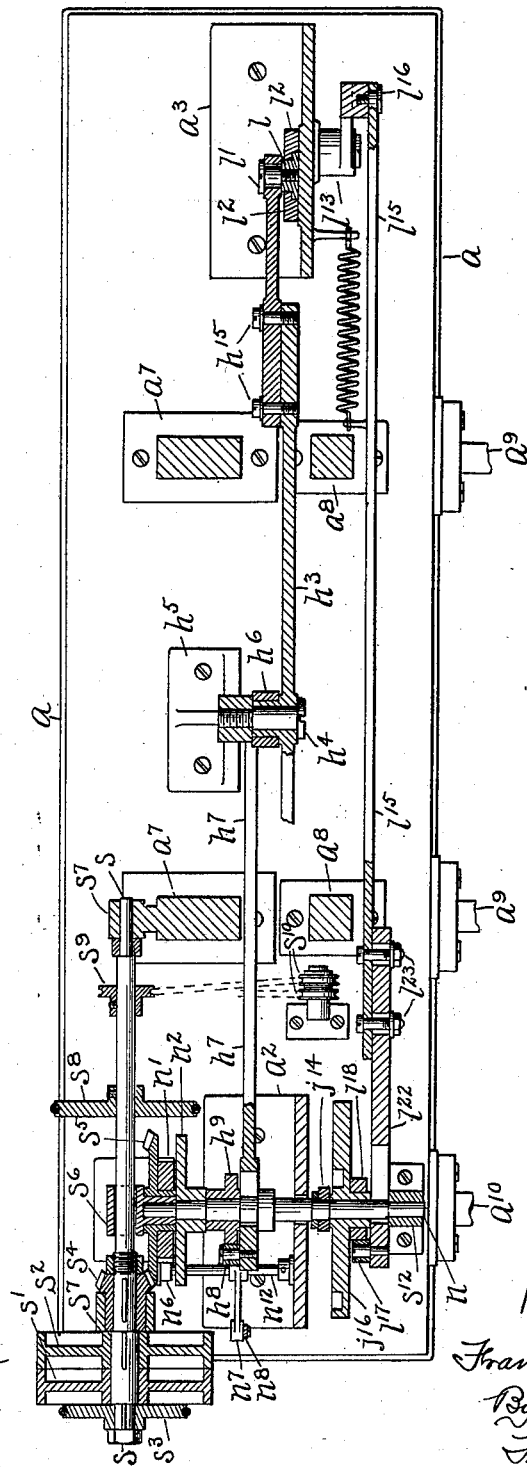
Figure 5:
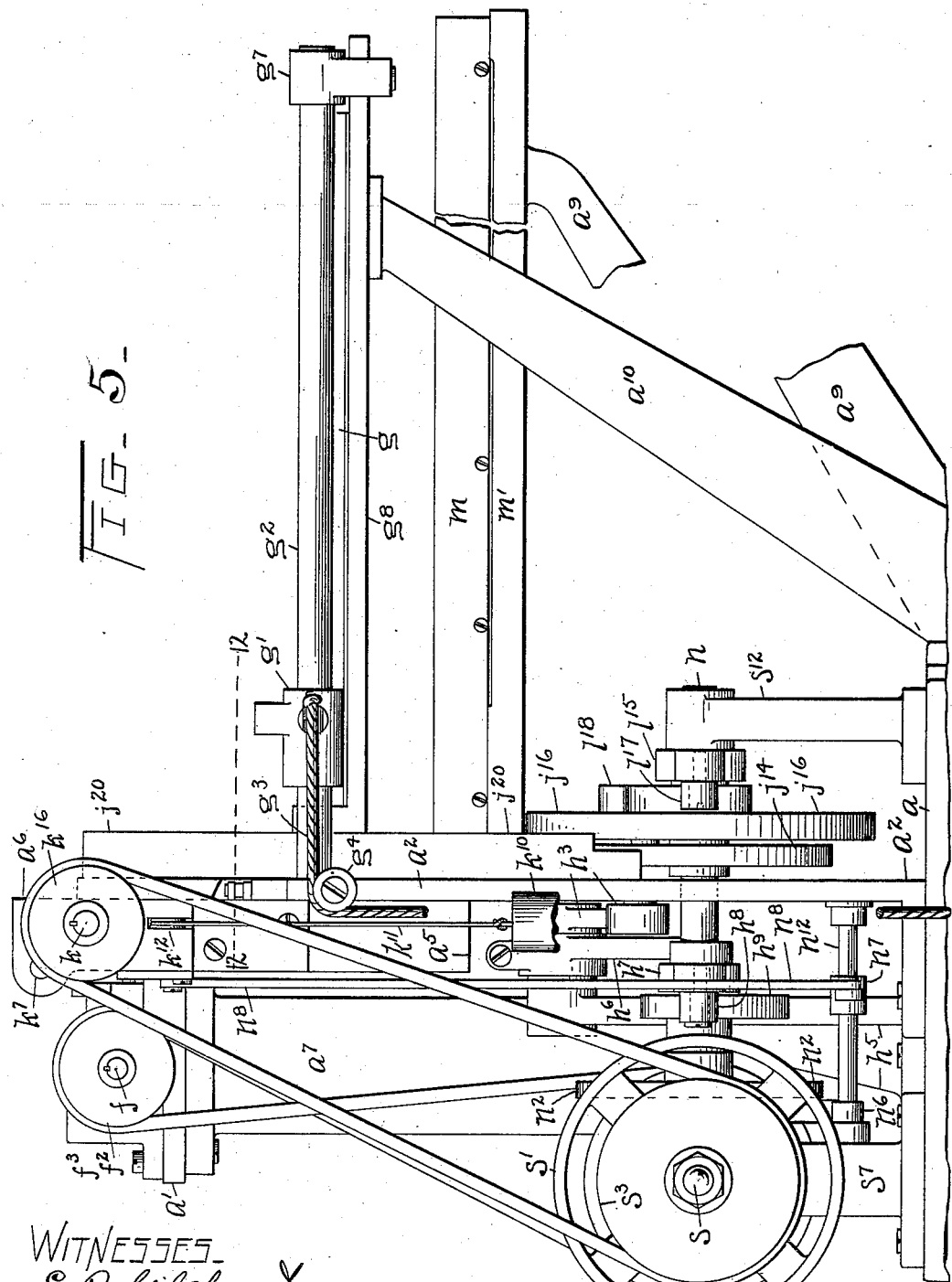

Figure 1 is a front elevation of the invention. Fig. 2 is a rear elevation. Fig. 3 is a plan, partly broken away and partly in section, on the line 3 3 of Fig. 6. Fig. 4 is a horizontal section through the driving-shafts, being on the line 4 4 of Fig. 1. These views are all on the same scale. Fig. 5 is an end elevation of the machine looking from the left-hand end of Fig. 1; and Figs. 6, 7, and 8 are vertical sections on the correspondingly-numbered lines of Fig. 1, Figs. 6 and 7 looking from the left and Fig. 8 looking from the right. These four figures are likewise on the same scale, which is larger than that of the preceding figures. The remaining figures are details and are on a still larger scale. Of them Fig. 9 is an enlarged view of the upper portion of section Fig. 7. Fig. 10 is a sectional plan on the line 10 10 of Fig. 9, and Fig. 11 is a sectional elevation on the line 11 11 of Fig. 10 looking in the direction of the arrows on such line. Fig. 12 is a horizontal section on the line 12 12 of Figs. 1, 5, or 6. Fig. 13 is a side elevation of the type-carrier with the type and block contained therein, and Fig. 14 is a cross-section on the line 14 14 of Fig. 13.

In the machine, as shown, $a$ is a suitably-supported bed-plate, from which rise at opposite ends the frame-plates $a^2$ $a^3$ and intermediate standards $a^7$, which carry the horizontal plate $a'$, supporting the ejecting mechanism. Though the machine is adapted to distribute type into any convenient receptacles, in the form shown it is intended to distribute it into long removable cases, which carry parallel channels, which cases are adapted to be transferred to a setting-machine, and I thus provide a table $m'$ for supporting these cases, which table is carried by the vertical standards $a^8$ and the diagonal struts $a^9$. The machine provides also a galley-table $g^8$ for receiving the type to be distributed, and this galley-table is supported by the frame-plate $a^2$ and the diagonal strut $a^{10}$.

There are several type-carriers which travel continuously through the machine, each receiving type from the galley and carrying it along as it is being distributed. Each of these carriers consists of a rectangular frame $c$, which is a plate of substantially the same thickness as the body of the type, having a rectangular opening in it of the same height as the type and somewhat longer than the longest line with which the machine is intended to be used. Figs. 13 and 14 show such a line of type $c^{16}$ in the carrier. In advance of the line is a block $c'$, which maintains the type on their feet. In the particular machine shown there are ten of these carriers, five of them ($c^5$ to $c^9$) being visible in Fig. 1, the sixth ($c^{10}$) in Fig. 8, and the other four ($c^{11}$ to $c^{14}$) in Fig. 2. Fig. 6 shows, as $c^{15}$, the final carrier $c^{14}$ in a different position of the mechanisms. These carriers travel continuously in an endless four-way path in a vertical plane, there being free moving space great enough to include the carrier. In the upper reach $p$ of the four-way path the carriers travel horizontally toward the right of the machine along a support which is at the forward edge of the plate $a'$. The carrier at the extreme end of the machine is lowered vertically into alinement with the track $p'$, (constituted by the strips $d^4$, $p^8$, $p^5$, $p^6$, and $p^7$, Figs. 7 and 2,) along which it is returned to the beginning end of the machine, where it may receive type (from the galley $g$) and be elevated opposite the end of the track $p$, it being understood that the depleted carrier at the right-hand end of the machine is lowered for the return at the same time that the filled carrier at the other end is elevated.

Starting now with the carrier just about to be filled, this carrier stands above and at the rear of the printer's galley $g$, which rests on the table $g^8$ and contains a column or page of type to be distributed. It is the carrier designated $c^{15}$ in Fig. 6. A weight (not shown) acting on a cord $g^3$, Figs. 1, 3, 5, and 12, passing over a pulley $g^4$, draws along the guide-rod $g^2$ a follower $g'$, which has an adjustable extension $g^6$. This follower and extension operate to shove the whole block of type on the galley rearward until the farthest line bears against the plate $h$, Fig. 6, the line thus lying in an opening $j^{21}$ in the plate $j^{18}$, which is directly in front of the plate $h$. This plate $j^{18}$ carries at its lower end a stud $j^{17}$, which projects into a slot in the yoke $j^{14}$, Figs. 1 and 6, which yoke carries a roller $j^{15}$, taking into a groove $j^{29}$ in the cam $j^{16}$. As hereinafter explained, whenever the conditions are ripe for a new line of type to be loaded into the carrier the yoke $j^{14}$ becomes locked to the plate $j^{18}$, wherefore for the present the roller $j^{15}$ may be considered as though rigid with the plate. Now by the rotation of the shaft $n$ (which is actuated intermittently in amounts of one rotation) its cam $j^{16}$, operating on the roller $j^{15}$, elevates the plate $j^{18}$ and carries the entrained line of type with it upward directly in front of the opening in the carrier $c^{15}$. Thereupon the block $j^{23}$, pivoted at $j^{24}$ and carrying an adjustable extension $j^{28}$, is forced by the leaf-spring $j^{25}$, Fig. 1, rearward, shoving the line of type rearward from the plate $j^{18}$ into the carrier $c^{15}$. As soon as the carrier $c^{15}$ is thus loaded the cam $h^9$, Figs. 1, 2, and 4, acts on the roller $h^8$ of the link $h^7$, which draws to the left of the machine the rocker-arm $h^6$, which is secured to the hub of a lever $h^3$, journaled on the stud $h^4$, carried by the standard $h^5$. This rocks the lever $h^3$, thus forcing upward the left-hand end thereof, which is connected by a stud $h'$ with the plate $h$. This elevates the loaded carrier $c^{15}$, and at the same time the other end of the lever $h^3$ brings down the depleted carrier $c^{10}$, as hereinafter explained. As the loaded carrier $c^{15}$ is elevated by the action of the plate $h$ it passes above the pawl-plate $h^{10}$, Fig. 6, forcing it into the recess $h^{11}$, allowing it to spring back by means of the spring $h^{12}$ beneath the filled carrier, thus retaining it in the elevated position while the plate $h$ descends. The completed carrier has now come into alinement with the upper path and is designated $c^5$, Figs. 1 and 6. As the carrier comes into this position its upper edge comes against the end of an arm $k^6$, which projects over its path, being fixed on the rock-shaft $k^7$, journaled in frame parts $a^4$ $a^6$, carried by the plate $a^2$. Fixed to this rock-shaft is the wide arm or plate $k^5$, Figs. 1, 2, and 6, and adjacent to this plate and loosely fulcrumed on the shaft is the arm $k^8$, which is elastically locked to the arm $k^5$ by the spring $k^9$. A block $k^{13}$, Figs. 3 and 6, stands just at the left of the elevated carrier $c^5$ and has a pair of arms or straps $k^{14}$, taking slidably around a rod $k^3$, parallel with the rock-shaft $k^7$. Slidable on a rod $k^3$ between the straps $k^{14}$ is a block $k^2$, which has fixed to its upper end the fragmentary nut $k'$, which is adapted to mesh with the threads of a screw $k$, which is journaled in the frame member $a^4$ and the bracket $a^6$ and is continuously rotated in the direction to drive the nut toward the right of the machine. Now as the carrier $c^5$, which has just been elevated, raises the end of the arm $k^6$ this rocks the shaft $k^7$ and thereby swings forward the arm $k^5$ and the arm $k^8$. The nut $k'$, being directly in front of the arm $k^8$, is forced with a yielding pressure into engagement with the threads of the constantly-rotating screw $k$, the yielding pressure being provided to prevent the parts from being jammed in case the threads of the nut and screw do not exactly mesh at first. The nut coming into mesh with the screw, the rotation of the latter advances the nut and with it the carrier $c^5$. As soon as the nut begins advancing it is held in positive engagement with the screw to the end of its forward movement by the arm or plate $k^5$. This forward movement advances the carrier $c^5$ and the whole line of carriers $c^6$ $c^7$ $c^8$ $c^9$ in advance thereof, the farthest carrier at the end of the forward movement of the nut being beneath the returning plunger $l^3$, hereinafter referred to, and the filled carrier being in the first ejection position, as shown at $c^6$ in Fig. 1. As this position of the parts is attained the carrier passes from beneath the end of the arm $k^6$, permitting the arm to drop and causing the arm $k^5$ to release the nut $k'$, which thereupon swings rearward by gravity out of engagement with the screw and is returned to its normal position by a cord $k^{11}$, Figs. 2, 3, and 5, secured to the block $k^{13}$ and passing over a pulley $k^{12}$ and carrying at its end a weight $k^{10}$. As soon as the nut $k'$ returns to its normal position a pin $k^{15}$, carried by the left-hand strap $k^{14}$, engages with the arm $n^{10}$ of a bell-crank lever pivoted at $n^{11}$, whereby the other arm $n^9$ of that lever draws up the link $n^8$, which through the rock-lever $n^7$ on the rock-shaft $n^{12}$ withdraws the pawl $n^6$, also on that shaft, from engagement with the tail $n^{18}$ of a pawl $n^4$, pivoted at $n^3$ to a disk $n^2$, secured to the shaft $n$. This releasing of the pawl $n^4$ allows the spring $n^5$ to force the nose $n^{16}$ of the pawl against the periphery of the notched disk $n'$, Figs. 2, 4, and 6, which is continuously revolving concentrically of the shaft, whereby as the nose $n^6$ engages with one of the notches the shaft $n$ is caused to rotate. At the completion of a rotation the pawl $n^6$, standing in the path of the pawl-tail $n^{18}$, withdraws the pawl-nose $n^{16}$ from the notched disk and the rotation of the shaft ceases. As hereinbefore described, the rotation of the shaft $n$ operates to fill a new carrier and elevate it into place and draw down the depleted carrier, and it will now be seen that this operation follows automatically upon the advancement of the previously-filled carrier into the first ejection position.

The removal or ejection mechanism carried by the horizontal frame-plate $a'$ is grouped into banks which correspond to the type-cases to be filled. In the machine shown the first of these banks contains ejectors adapted to coöperate with the type-cases $m^7$, which may receive the spaces of various sizes in the line. Then follow four banks, each of which coöperate with the respective cases which receive character-type, as determined by the setting-machine employed. The last bank is shown as consisting of two ejectors coöperating with the type-case $m^6$, which may be employed to receive miscellaneous sorts. The grouping into banks and the arrangement of the type-cases, however, is an immaterial matter and one that varies with the setter employed. The ejection mechanism is the same throughout and is simply varied in number in the different banks shown. The ejecting mechanism employed is the same system, broadly, which is shown and described in my prior application, Serial No. 742,042, filed December 30, 1899, and is only claimed herein in conjunction with coöperating parts in a distributing-machine.

Referring now more particularly to Figs. 9, 10, and 11, the carrier $c$, containing type, is shown in the path $p$, supported by the plate $a'$ and confined laterally between the rails $e^7$ $e^8$ on its rear side and the notched blocks $d$ on its forward side, which blocks are held in place by nuts $d^3$, screwing onto projecting studs $d^6$. The ejectors are on the rear side of the type, there being one ejector for each character of type to be distributed, and they are adapted to be reciprocated to shove type from the carrier. In the form shown the ejector consists of two jointed pieces, the type-engaging piece being a guided plate $e$ and the driving piece being a bar $e'$, pivoted thereto. The width of a plate $e$ is slightly less than the width of a type. As heretofore stated, the distribution of type is governed by the definitive nicks in the edge thereof. On the forward end of the ejector-plates $e$ are wards $e^{11}$, corresponding to the nicks in the type with which the ejector is adapted to coöperate. The plates $e$ are guided in a horizontal plane in notches in the rails $e^7 e^8$ and in vertical slots in the rails $e^{10}$, in which they fit somewhat loosely. The ejector is thus permitted a longitudinal movement and a slight degree of rotation about an axis within the rail $e^{10}$. As will appear, this rotation is but slight, and the allowable amount of play in the guides is sufficient to permit this movement without providing a positive journal.

Pivoted at $e^4$ to the ejector-plate $e$ is the bar $e'$, which has its rear end formed into a yoke curving around in a U shape, in the interior of which are ratchet-shaped teeth $e^5$. These teeth are of the proper form to mesh with the teeth of a ratchet-cylinder $f$, which is journaled in bearings $f'$ and passes through the yoke of all the ejectors and is continuously rotated in the direction of the arrow in Fig. 9 by a belt on the pulley $f^2$. The bar $e'$ extends forward from the pivot $e^4$, passing through a strap $e^3$ on the side of the plate $e$ and having its extreme end $e^2$ beneath the projections $e^{13}$ of the upper rail $e^7$, which establish the notches $e^{12}$ which the forward end of the plates $e$ occupy. Thus normally the bars $e'$ are held out of engagement with the cylinder $f$.

The forward ends of the wards of the ejectors rest against the side of the advancing line of type being pressed forward by the spring $e^9$, which acts diagonally to hold the forward end of the ejector against the type with a slight pressure and at the same time to press it firmly against the side of the notches $e^{12}$ toward the direction from which the line of type is advanced. The notches $e^{12}$ are so placed that as the ejector stands in the position just described its forward end presses the advancing line of type at a point directly opposite the stops or projections of the block $d$, which are between the channels $d'$, and thus the ejector cannot push a type out of the carrier into a channel under the action of the spring $e^9$. The notches $e^{12}$ in the guides $e^7 e^8$ are enough wider than the ejector to permit a considerable advancement of the end of the ejector in the same direction as the type is traveling. The end $e^2$ of the bar $e'$ stands normally, as stated, beneath the side wall $e^{13}$ of this notch, and the bar is thus maintained out of engagement with the cylinder $f$. Each ejector maintains this position as the line of type passes in front of it until a type having the combination of nicks corresponding to the wards on any particular ejector is brought in front of that ejector. As soon as this takes place, however, the spring $e^9$ causes the plate $e$ to be advanced, the wards passing into the nicks, and thereupon the further advancement of the line of type brings the next type in the line (unless it is of the same character, and hence has the same nicks as the type in engagement, which condition is hereinafter referred to) against the side of the wards of the ejector, swinging the end of the ejector in the same direction as the line is traveling. The result of this slight rotative movement of the ejector is to cause the end $e^2$ of the bar $e'$ to be released from under the projection $e^{13}$, passing into the notch $e^{12}$ at the moment that the type comes opposite the channel $d'$ in the block $d$. The forward end of the ejector-bar $e'$ being released, the rear end drops into engagement with the cylinder $f$, which, rotating the upper side forward, shoves the ejector forward, thus shoving the type into the notch $d'$, opposite the ejector, which notch communicates with a vertical tube $d^2$, which carries the type to the proper case. The tube is twisted on a vertical axis ninety degrees to turn the type around flat side to the front of the machine and as it drops into the rear of the type-case is fed forward by the continuously-revolving wiper-shaft $m^2$ at the rear of the type therein, shoving forward such type and the retaining-block $m^5$. Thus the engagement of the ejector-wards with a correspondingly-nicked type followed by a different type causes the ejection of the engaged type and its passage into its proper case.

The receiving-channels $d'$ may be made very materially wider than the corresponding type, the excess of width, however, being less than the thickness of the thinnest type, wherefore it shall be impossible for two type to pass into the channel. Hence while the type is being ejected the line may still continue to advance, the type being clear of the line before the line moves far enough to cause the type to be advanced against the side of the receiving-channel. The motion of ejection being only for the width of the body of the type and the mechanism herein described causing it with extreme rapidity, there may still be a sufficiently rapid advancement of the line of type to give a very high rate of distribution. Moreover, several ejectors may be acting at the same time. As soon as the type is shoved from the line (which requires a very short movement of the ejector and is performed very rapidly) the teeth $e^5$ at the rear of the gear-cylinder $f$ have engaged with the cylinder and the rear end of the ejector has been elevated, bringing the lower reach of teeth into engagement with the cylinder, whereby the ejector is withdrawn. As the ejector is thus withdrawn the spring $e^9$ causes it to return to its positive engagement against the side of the notch $e^{12}$, as soon as the ends of the wards clear the line of type. The rear end of the bar $e'$ being elevated, the forward end is depressed below the bottom of the projections $e^{13}$ between the notches $e^{12}$, and as the rearward movement is completed the upper rear edge of the bar $e'$ impinges against the edge of the projecting bracket $f^3$, which forces the bar downward out of engagement with the cylinder. As the teeth are released the bar $e'$ swings to its initial position, the end $e^2$ being beneath the projection $e^{13}$ and preventing engagement with the cylinder. The parts retain this position until the ejector is again advanced by its wards springing into the nicks of another type of the same denomination. When the type engaged happens to be at the rear end of the line, the adjacent wall of the carrier engages the side of the wards and actuates the ejecting mechanism. The gaps in the line of type left by the removal of the ejected type are at once closed up, thus compacting the remaining line, by the continued advancement of the line, the pressure of ejectors in advance of the gap against the block $c'$ and against the type causing the type in advance of the gap to come to rest until the gap is closed. As the line is advanced through the machine more and more type are removed, under certain circumstances all the type of the line being distributed by the time the carrier reaches the end of its travel. There is thus throughout the distribution (and usually at the beginning thereof) a gap between the end of the block $c'$ in the carrier and the forward end of the carrier. The springs $e^9$ tend to advance the ejectors into this gap, but lugs $e^{14}$, provided thereon, (made, preferably, by turning aside a portion of the metal of the plate $e$,) stand just behind the projections $e^{13}$ a distance equal to the length of the wards, wherefore these lugs, while not interfering with the wards passing into the properly-nicked type, prevent the ejectors passing into this gap farther than the length of these wards; but this slight intrusion does no harm, for the wards simply engage with the back side of the follower-block $c'$, which is beveled, as shown in Fig. 14, and are thus forced inward thereby. When the ejector is brought into ejecting operation, the lug $e^{14}$ is moved clear of the projections, as shown in Fig. 10, where one of the ejectors is in this position.

It has been hereinbefore stated that under certain conditions all the type in a line would be distributed when a carrier had traveled through the length of the machine. Generally, however, a few type are left in the carrier to be distributed on the second trip, from the fact that when two or more adjacent type are of the same character, and thus are similarly nicked, the wards of the ejector, though entering the first type, will not eject it, not being deflected until a differently-nicked type comes against them. Hence only the last type of the two or more will be ejected at this time. In the machine shown in the drawings from one to six type from a four-inch line are left in each carrier ordinarily after passing all the ejectors, which type are carried around and distributed the next time the carrier passes through the machine. In practice this number is kept within the limits stated by having duplicate channels in the cases of a few of the letters which are most numerous, which provision from the standpoint of the setter alone is a desirable feature. Without these duplicate channels the number, though greater, would still be within the allowable limits. The carriers are enough longer than the width of the galley so that the type ordinarily left in the line will not interfere with the addition of a whole new line to that carrier. Under exceptional circumstances when too many type are left in the carrier—as, for example, when the line consists of a large number of similarly-nicked quads used in filling out the end of a paragraph—the carrier will not receive its new line, but will travel through the machine with the remainder until it is reduced to the maximum allowable amount to which the full line may be added, as hereinafter explained. This contingency, however, in practice may be rendered still less frequent by using alternate em quads and en quads, for example, when setting the line.

Coming now to the mechanism for returning the depleted carriers, reference is had particularly to Figs. 1, 2, 4, and 8. As the forward carrier from which nearly all (sometimes all) the type have been discharged reaches the right-hand end of the machine, it is in position to be lowered to the return-track, as heretofore alluded to. This is accomplished by the same lever $h^3$, which, as heretofore explained, elevates the newly-filled carrier at the other end of the machine. At the advance end, however, this lever (adjustable by the screws $h^{15}$) is connected by a stud $l'$ with the slide $l$, carried between guides $l^2$ on the rear side of the frame-standard $a^3$. Attached to the upper end of the slide is the plunger $l^3$, which stands directly above the carrier coming into the extreme forward position, which carrier is indicated at $c^{10}$ in Fig. 8. The carrier in this position rests on the pawl-plate $l^4$, pivoted in a recess $l^5$ in the frame-plate $a^3$ and held with its upper end beneath the carrier by the leaf-spring $l^6$. The lower portion $l^7$ of this pawl-plate has a projection extending into a beveled notch $l^8$ in the slide $l$. From this it results that as the lever $h^3$ draws downward the slide $l$ the beveled upper edge of the groove $l^8$ presses the pawl-plate $l^4$ into its seat, and the plunger $l^3$, engaging with the top of the carrier $c^{10}$, forces the carrier downward between the frame-plate $a^3$ and the plate $l^{21}$, carried thereby, until it is in alinement with the lower track $p'$. A block $l^9$, carrying a lug $l^{10}$, projecting beneath and beyond the plate $l^{21}$ at a point to the right of the position into which the descending carrier comes, is thus adapted to follow behind the carrier, shoving it onto the return-track. This block is carried between guides $l^{11} l^{11}$ and has a stud $l^{12}$, which takes into a slot in the lever $l^{13}$, Figs. 1, 4, and 8, which is pivoted at $l^{14}$ to the frame-plate $a^3$ and is adapted to be drawn toward the left of the machine by the link $l^{15}$, (adjustable by the extension $l^{22}$ and screws $l^{23}$,) pivoted at $l^{16}$ and carrying at its other end a roller $l^{17}$, engaged by a cam $l^{18}$ on the shaft $n$ and counteracted by a spring $l^{19}$. This cam is so timed that just after the plunger has brought down the depleted carrier the cam acts to force it and all the depleted carriers on the lower track to the left the length of one carrier, bringing the farthest carrier into position for refilling, and then the spring $l^{19}$ returns the lever $l^{18}$ and its block $l^9$ to normal position.

As heretofore pointed out, a few type will ordinarily be left in each carrier after it has passed all the ejectors, which type have to remain in the carrier to be distributed on the next trip through the machine. During the distribution the remaining type were being constantly collected at the left-hand end of the carrier. In the machine shown, however, the completed line is fed into the carrier at the same end, wherefore I provide means for shifting the remaining type and block $c'$ to the other end of the carrier as it comes into the position for loading. This is accomplished as follows: At the left-hand end of the carrier, on the inner side of the opening, is a notch $c^3$, Figs. 13 and 14, and coöperating with this, on the rear side of the carrier, is an incline or beveled notch $c^4$. Now as the carrier is returning into position to be loaded this beveled notch strikes the projecting nose of a pawl $j$, Figs. 6 and 12, which is carried by a block $j^2$ and pressed toward the carrier by spring $j^3$. This nose is pressed backward by the bevel $c^4$ and then springs into the notch $c^3$, wherefore it stops the remaining type and block, and the continued advancement of the carrier brings this remaining type and block into the right-hand end of the carrier, as shown in Fig. 12, so as to be out of the way of the new line, and if the type remaining are not more than the maximum allowed the new line will be fed into the space in the carrier between its left-hand end and the nose of the pawl $j$ in the manner heretofore explained. If the type remaining in the carrier should be more than the allowable maximum, there thus not being room enough left in the carrier for a new line of type, I provide mechanism for preventing the insertion of that line. It will be remembered that in describing the insertion it was stated that the yoke $j^{14}$, Figs. 1 and 6, became under normal circumstances locked to the plate $j^{18}$, which resulted in the cam $j^{16}$, which acts on the roller $j^{15}$, elevating that plate. It will be apparent that if this locking does not take place the cam will elevate the yoke idly without feeding new type into the carrier. Now this locking is determined by the amount of type which remains in the carrier, as follows: The block $j^2$, which carries the pawl $j$, is journaled on a rod $j^4$, Figs. 2, 6, and 12, on which it may both slide and rotate. It stands normally in the position shown, being drawn toward the right by a weight (not shown) on the cord $j^5$, passing over a pulley $j^6$. Below the rod $j^4$ is a parallel rod $j^7$, carried at its ends in the rock-arms $j^8$, fixed to the rock-shaft $j^9$, which is journaled in the frame parts $a^4$ $a^5$. On this rod $j^7$ is a collar $j^{10}$, adjustably fixed to the rod and extending into the path of the block $j^2$ as it is advanced toward the left by the type remaining in the carrier. If this block is sufficiently advanced, it will impinge against the beveled end of the collar, thereby depressing it, which depresses the rod $j^7$ and rocks the shaft $j^9$. This latter shaft has secured to it the downwardly-extending rock-arm $j^{11}$, the lower end of which engages a pin $j^{12}$, Figs. 1 and 2, which passes through the frame $a^2$ and on the forward side of the machine lies just above a beveled nose $j^{13}$ on the yoke $j^{14}$. Now if the carrier coming into position to be loaded contains too many type to receive a new load the block $j^2$ is advanced to the right sufficiently to engage the collar $j^{10}$, which, as stated, swings rearward the arm $j^{11}$ and withdraws the pin $j^{12}$ from engagement with the beveled nose of the yoke $j^{14}$. This leaves the yoke entirely free from the plate $j^{18}$, and the cam $j^{16}$, acting on the roller $j^{15}$, simply elevates this yoke idly, and no more type is fed into the carrier, the carrier being again passed through the machine with the type it already contains. If, on the other hand, when the type remaining in the carrier is within the allowable amount, as is most usually the case, the block $j^2$ will not be advanced far enough to engage the collar $j^{10}$, wherefore the rod $j^7$ will not be depressed, the arm $j^{11}$ will not be actuated, and the pin $j^{12}$ will remain in engagement with the nose $j^{13}$ of the yoke $j^{14}$. Then as the cam $j^{16}$ acts on the roller $j^{15}$ and elevates the yoke the latter will be tipped by its beveled nose to the right in Fig. 1, so that the stud $j^{17}$, extending from the plate $j^{18}$, instead of having the unobstructed vertical slot $j^{27}$ below it, will be brought to the end of the diagonal slot $j^{22}$, wherefore the yoke will become locked to the plate $j^{18}$ and the cam will operate to elevate that plate and to feed type into the carrier, as hereinbefore explained. To increase the range of adjustment of the collar $j^{10}$, I make it considerably longer through one half of its periphery than the other half, wherefore, as may be seen in Fig. 2, by turning it around the rod $j^7$ for a half-revolution I greatly vary the distance between the block $j^2$ and the bevel. When the carrier is elevated either with a new load or with the remainder of the old load, the block $j^2$ is simply tipped up on its pivot $j^4$ (an opening $j'$ in the frame-plate $a^2$ allowing this movement) and drops back by gravity into place to intercept the remaining type in the next carrier.

The power arrangement of the machine shown is as follows, Figs. 4, 5, and 6: The machine is driven by tight and loose pulleys $s'$ $s^2$ on the shaft $s$, which is journaled in standards $s^7$ and $s^7$. A belt passing over the sheave $s^3$ on this shaft and the sheave $k^{16}$, Figs. 3 and 5, on the end of the screw $k$ drives the latter. Another belt over the sheaves $s^8$ and $f^2$ drives the ratchet-cylinder $f$, while another belt over the sheave $s^9$ and beneath the guide-pulleys $s^{10}$ drives, by means of the pulley $m^4$, Figs. 1 and 2, a wiper-shaft $m^2$.

The remainder of the mechanism is driven by cams already described on the shaft $n$, which is journaled in the standards $s^6$ and $s^{12}$ and receives its movement by being clutched to the notched disk $n'$, which is rigid with the hub of the beveled gear $s^5$, Figs. 4 and 6, which meshes with the beveled gear $s^4$ on the shaft $s$.

Having described my invention, I claim—

1. The combination, in a type-distributing machine, of means for holding a compacted line of successive type and means for removing type from points in the line intermediate of its ends, substantially as described.

2. In a type-distributing machine, in combination, means for holding a compacted line of successive type and means for removing type simultaneously from different points in the line, substantially as described.

3. The combination, in a type-distributing machine, of a carrier adapted to contain a plurality of contiguous type, means for removing type from intermediate points of the carrier, and means for advancing the carrier relatively to said removing means, substantially as described.

4. In a type-distributing machine, in combination, means for holding a plurality of type, means for removing intermediate type therefrom, and means for closing up the gap caused by such removal, substantially as described.

5. In a type-distributing machine, in combination, a carrier adapted to hold a line of type, means for advancing the carrier, means for successively removing type therefrom intermediate of the ends of the line, and means for continually collecting together the type remaining in the carrier after such removal, substantially as described.

6. In a type-distributing machine, in combination, a rigid carrier adapted to hold a line of type, a slidable block also held by the carrier and adapted to retain the type on their feet, means for removing type from the line at points intermediate of the ends thereof, means for advancing the carrier, and means for collecting together toward the rear end of the carrier the remaining type and said block, substantially as described.

7. In a type-distributing machine, in combination, a carrier adapted to hold a plurality of contiguous type, ejectors adapted to shove type from the carrier, means for causing relative movement in the direction from one type to another between the carrier and ejectors, and means for actuating the ejectors to shove type from different points of the carrier, substantially as described.

8. In a type-distributing machine, removing mechanism including wards adapted to be moved longitudinally to enter nicks in the type, provision for the movement of said wards laterally with the type when in said nicks, and means whereby said lateral movement of the wards actuates the removing mechanism, substantially as described.

9. The combination of means for holding characteristically-nicked type, a system of characteristically-placed wards adapted to enter the nicks of corresponding type, means for advancing the type relatively across the wards, means for removing the type, and means whereby the engagement of said wards by the part following the engaged type actuates said removing mechanism, substantially as described.

10. The combination of means for holding a line of characteristically-nicked contiguous types, a system of characteristically-placed wards adapted to enter the nicks of corresponding types, removing mechanism and means whereby it is actuated by the engagement of said wards with a succeeding type of different nicking, substantially as described.

11. In a type-distributing machine, in combination, means for holding a line of definitively-nicked type, means for advancing it, wards adapted to enter said nicks and shiftable in the direction of movement of said line, whereby when the wards enter a corresponding type the next succeeding part of the line if of different nicking will shift the wards, and means whereby such shifting of the wards actuates removing mechanism, substantially as described.

12. In a type-distributing machine, an ejector having on its forward end wards adapted to enter nicks in suitably-held type, means for giving said ejector a tendency to move toward the type whereby the wards automatically enter the nicks of corresponding type when presented, said ejector being capable of a lateral shifting when the wards are in the nicks, mechanism actuated by such lateral shifting for causing a longitudinal movement of the ejector which movement shoves the type from the line, substantially as described.

13. In a type-distributing machine, in combination, means for holding a line of type, a pathway for said line in which each type travels alternately past points where it is confined in a pathway and where it is adapted to be removed therefrom, removing mechanism adapted to engage the type when it is in the confined position and adapted to be maintained in engagement by the next succeeding type until the engaged type moves into an unconfined position, and means actuated by such movement for causing the removal of the type when it comes into this position, substantially as described.

14. In a type-distributing machine, in combination, a series of carriers in the form of frames, means for causing them to travel continuously through the machine, means for loading them with type, means for ejecting type from various points in the line as the carriers travel along, and means for continuously collecting together in the carrier the type remaining after such ejection, substantially as described.

15. In a type-distributing machine, in combination, a carrier consisting of a plate having a rectangular opening adapted to receive a line of type, means for moving said carrier through the machine, means for removing type from said carrier, said opening being longer than any line the machine receives, whereby type undistributed on one trip of the carrier may be added to a new line of type on a second trip, substantially as described.

16. In a type-distributing machine, in combination, a system of carriers adapted to travel repeatedly through the machine, means for feeding into such carriers a line of type to be distributed, means for removing such type from intermediate points in the carrier during its progress through the machine, means for collecting together the type remaining in the carrier after removal, and means governing the feeding of a new line into the carrier which is dependent upon the amount of type remaining in the carrier, substantially as described.

17. In a type-distributing machine, in combination, means for moving type to be distributed, a path for such movement one wall of which consists of alternate stops and openings, removing mechanism adapted to engage a type when it is opposite a stop and be shifted laterally by the advancing type until it is opposite an opening, substantially as described.

18. In a type-distributing machine, in combination, a carrier adapted to hold a line of type, means for advancing said carrier along a path therefor, one wall of said path consisting of alternate stops and openings, removing mechanism adapted to engage a type when it is opposite a stop and be shifted laterally by the advancing line until it is opposite an opening, and means for then actuating the removing mechanism to remove such type, substantially as described.

19. In a type-distributing machine, in combination, a system of ejectors, a path for the type in front of the ejectors, means for advancing the type along said path, the forward wall of said path consisting of alternate openings and stops, the ejectors being normally behind the stops, means whereby the presentation of the corresponding type to an ejector shifts it to a point opposite the adjacent opening, and means for then advancing the ejector to shove the type into the opening, substantially as described.

20. In a type-distributing machine, in combination, a path for a line of type, one side of which path is composed of alternate stops and openings, a system of ejectors on the opposite side of the path having wards adapted to enter nicks in the type on that side of said type and in line with the stops and adapted to be deflected until they are opposite the openings, and means for then causing the ejector to shove the type from the line into the opening, substantially as described.

21. In a type-distributing machine, in combination, means for holding suitably-nicked type, an ejector carrying wards adapted to enter the nicks of a corresponding type and carrying teeth on three sides of an opening, a revolubly-toothed cylinder lying normally loosely within said opening, and means actuated when the wards enter the nicks of a corresponding type which causes the engagement of said teeth with the cylinder, substantially as described.

22. In a type-distributing machine, in combination, means for holding a line of suitably-nicked type, a system of guide-plates having characteristic wards on their front ends adapted to enter correspondingly-nicked type, each of said plates carrying a yoke which presents internal teeth, a continuously-revolving toothed cylinder lying loosely within said teeth, and means whereby lateral shifting of the plate causes the yoke to engage with said teeth, substantially as described.

23. In a type-distributing machine, in combination, a series of longitudinally-movable plates having wards on their forward ends, yoke-pieces pivoted to said plates and presenting internal teeth on three sides of an opening, a toothed cylinder lying loosely in said opening adapted to be continuously revolved, a rigid stop or wall normally holding the yoke out of engagement with the gear-cylinder, said plate being capable of a lateral movement which disengages the yoke member from its retaining-stop and allows it to pass into engagement with the gear-cylinder whereby the plate is given a reciprocation, substantially as described.

24. In a type-distributing machine, in combination, a path in which a line of type is adapted to be fed, one wall of said path consisting of alternate stops and openings, longitudinally-movable plates on the opposite side of said path in line with the stops, means for giving said plates a movement toward the path, wards on the forward ends of said plates adapted to pass into nicks in corresponding type, there being provision for a lateral movement of said plates whereby a differently-nicked succeeding type may shift a plate to a position opposite an opening, a yoke-piece carried by the plate and having engageable teeth, a gear-cylinder adapted to engage said teeth but normally out of engagement therewith, means whereby when the plate is laterally shifted the yoke-piece comes into engagement, substantially as described.

25. In a type-distributing machine, in combination, a system of longitudinally-movable plates $e$ set on edge, a yoke-piece $e'$ pivoted to said plates, each yoke-piece carrying internal teeth $e^5$ on three sides of an opening, a gear-cylinder adapted to be continuously revolved and extending loosely through the openings of different yokes, a series of stops $e^{13}$ with the under side of which the forward end of the yoke-piece $e'$ normally engages, there being provision for the lateral movement of the forward end of the plates $e$, an opening into which the forward ends of the yoke-pieces pass in said lateral movement whereby the yoke-piece is freed and its rear end passes into engagement with the gear-cylinder, substantially as described.

26. In a type-distributing machine, in combination, means for supporting a supply of undistributed type, a carrier adapted to receive a line of such type in a position out of alinement with the supply, a plate between the supply and carrier, extending across the carrier, and having an opening adapted to receive a line from the supply, means for placing such line in said opening, means for moving said plate with the line therein until the type in the opening come opposite the carrier, and means for moving the type from the opening into the carrier at this point, substantially as described.

In testimony whereof I hereunto affix my signature in the presence of two witnesses.

FRANCIS B. CONVERSE, Jr.

Witnesses:
ALBERT H. BATES,
H. M. WISE.